United States Patent [19]
Etessam

[11] 3,824,787
[45] July 23, 1974

[54] INTERMITTENT COMBUSTION DEVICE WITH A PAIR OF COEXTENSIVE AND COAXIAL MUTUALLY INDUCTIVE CHAMBERS

[76] Inventor: Alexander Hossen Etessam, 91 Eldorado Ave., Shemiran, Tehran, Iran

[22] Filed: Sept. 20, 1972

[21] Appl. No.: 290,740

Related U.S. Application Data
[63] Continuation of Ser. No. 55,379, July 16, 1970, abandoned.

[52] U.S. Cl. ............... 60/248, 60/263, 60/269
[51] Int. Cl. ................................. F02k 7/04
[58] Field of Search .......... 60/248, 263, 249, 264, 60/269, 247, 39.77

[56] References Cited
UNITED STATES PATENTS

| | | | |
|---|---|---|---|
| 2,573,697 | 11/1951 | Dunbar et al. | 60/248 |
| 2,675,196 | 4/1954 | Marney | 60/269 |
| 2,740,254 | 4/1956 | Ballauer et al. | 60/263 |
| 2,750,733 | 6/1956 | Paris et al. | 60/248 |
| 2,872,780 | 2/1959 | Schmidt | 60/263 |

FOREIGN PATENTS OR APPLICATIONS

| | | | |
|---|---|---|---|
| 784,013 | 10/1957 | Great Britain | 60/248 |

*Primary Examiner*—Carlton R. Croyle
*Assistant Examiner*—Warren Olsen
*Attorney, Agent, or Firm*—Kenyon & Kenyon Reilly Carr & Chapin

[57] ABSTRACT

A gas generator for a turbine or jet power plant comprising a pair of coextensive combustion chambers normally coaxially arranged between the inlet and outlet and each operating on the pulse jet principle, the combustion chambers converging towards the outlet in the form of mutually inductive nozzles so that the combustion chambers operate in an alternate cycle providing continuous throughput of air from inlet to outlet. Embodiments include power plants incorporating the combustion chambers and suitable for stationary purposes such as road vehicles, subsonic aircraft and supersonic aircraft, turbine and bypass engines.

17 Claims, 8 Drawing Figures

INVENTOR
ALEXANDER HOSSEN ETESSAM
BY
ATTORNEYS

PATENTED JUL 23 1974 3,824,787

INVENTOR
ALEXANDER HOSSEN ETESSAM

BY
Kenyon & Kenyon Reilly Carr & Chapin
ATTORNEYS

INTERMITTENT COMBUSTION DEVICE WITH A PAIR OF COEXTENSIVE AND COAXIAL MUTUALLY INDUCTIVE CHAMBERS

This is a continuation of U.S. Pat application Ser. No. 55,379, filed July 16, 1970 now abandoned.

The present invention relates to a gas generator for a turbine or jet power plant and to power plant for stationary purposes such as road vehicles, for subsonic aircraft and for supersonic aircraft.

SUMMARY OF THE PRIOR ART

The gas generator of the present invention operates on the pulse jet principles. In a conventional pulse jet a fuel air mixture is drawn through a non-return valve into a combustion chamber which communicates with the jet outlet via a tailpipe which acts as a scavenger. The mixture is ignited in the combustion chamber creating an explosion, with the exhaust gases passing through the tailpipe thereby and creating a reduced pressure allowing a fresh charge of fuel air mixture to be drawn in through the non-return valve. The engine thereafter operates with continuous discrete explosions or pulses, normally at frequencies of the order of 100 to 200 pulses per second. Whilst pulse jet engines first came into operation towards the end of World War II with the German V1 weapon they were largely superseded by the gas turbine engine and ram jet both of which allowed continuous throughput of air from inlet to outlet. Thus one of the chief disadvantages of the pulse jet was that it did not allow for continuous throughput of air, the upstream side of the valve normally being at atmospheric pressure. Furthermore, due to the intermittent cycle the efficiency was low. The pulse jet has however two important advantages: firstly it operates at constant volume as opposed to constant pressure at which gas turbines operate and this allows for greater thermodynamic efficiency in the expansion of the gases, and secondly it does not require any moving parts other than the valve components and is therefore extremely cheap and simple to manufacture. It is noted that "constant volume" means the combustion process is completed and peak pressure is reached before the resulting gas begins to expand to a lower pressure. Absolute constant volume combustion does not, however, occur in practice.

SUMMARY OF THE INVENTION

The present invention provides a gas generator operating upon the pulse jet principle but with a major improvement in performance so that it can be used to provide a cheap and efficient gas generating stage in a number of power plants suitable for different applications including supersonic jet engines as well as stationary engines and subsonic aircraft engines. In its simplest form, the gas generator itself provides substantially all the necessary components of a jet engine.

The gas generator of the invention comprises a pair of combusion chambers each of which are in effect pulse jets. The nozzles of the pulse jets are arranged to converge together so as to be mutually inductive. In this way the combustion chambers operate as pulse jets in alternate sequence with the ignition cycle in one chamber creating a reduced pressure in the other chamber thereby assisting the fuel air intake and at the same time creating or allowing continuous throughput of air from the inlet to the outlet.

In the preferred form, the combustion chambers are arranged to be substantially coextensive and coaxial about the axis of the power plant. Thus the non-return valves may be arranged in a cross-sectional plane at the downstream end of a diffuser inlet and, in a jet engine, the exhaust gases may pass directly to the jet outlet.

Any form of non return valve means may be employed and as these are already known they will not all be described in detail. Thus while one form of flap valve is described in detail hereafter, the non return valve means may consist of a structure having no moving parts such as a surge chamber construction or labyrinth designed to allow the ingress of fuel air mixture at relatively low pressure but to form a barrier to the exploding mixture within the combustion chambers. So called "valveless" pulse jets are well known.

The combustion chambers may be separated by a partition which is formed with a passage for coolant fluid. Thus it may be hollow and be adapted to receive bleed air e.g. from the diffuser.

Air by-pass ducts may be provided along the axis of the power plant or surrounding the outermost combustion chamber or both and a mixing zone may be provided downstream of the combustion chambers and upstream of the jet outlet, assuming that the power plant is a jet engine. However, as will become apparent it is possible to provide a turbine construction with an axle passing centrally through the power plant and connected to a compressor adjacent the air inlet and to a turbine structure adjacent the jet outlet. A construction of this type employing a turbine may be used as a jet engine but may alternatively be used to drive rotary components such as propellers or vehicle wheels.

Special mixing means such as a fluted partition may be provided downstream of the combustion chambers for mixing the heated exhaust and by-pass air streams prior to their emergence at the nozzle or action upon the turbine.

Thus where a turbine is used it is preferred to use by-pass air streams to cool the very hot exhaust gases before they reach the turbine.

The simplest form of engine suitable for supersonic aircraft will comprise the coaxial combustion chambers arranged centrally between a supersonic nose and inlet structure defining a diffuser, at the upstream end, and a supersonic jet nozzle structure at the downstream end.

It will be evident that a conventional pulse jet cannot possibly be used in such an application since there is no provision for the continuous throughput of the high pressure air from the inlet. With the construction of the present invention on the other hand one or the other set of valves will allow substantially unimpeded passage for the air into which the fuel is preferably sprayed under pressure.

Embodiments of the invention are hereafter described in greater detail with reference to the accompanying drawings in which:

FIG. 1 is a schematic longitudinal sectional view through a simple jet power plant incorporating the present invention, FIG. 2 is a magnified front view of part of the valve structure of FIG. 1 viewed in the direction of incoming air, FIG. 3 is a cross-sectional view of part of the valve structure showing one form of fuel input, FIG. 4 is a pressure time graph showing the explosion sequence, FIG. 5 is a view similar to FIG. 1 of a by-pass engine suitable for subsonic operation, FIG. 6 is a view of the structure of FIG. 5 from the rear showing the fluted mixing partition, FIG. 7 is a simplified side sectional view of a supersonic power plant incorporating the present invention, and FIG. 8 is a simplified side sectional view of a gas turbine by-pass engine incorporating the present invention.

DETAILED DESCRIPTION OF DRAWINGS

Figure 1:
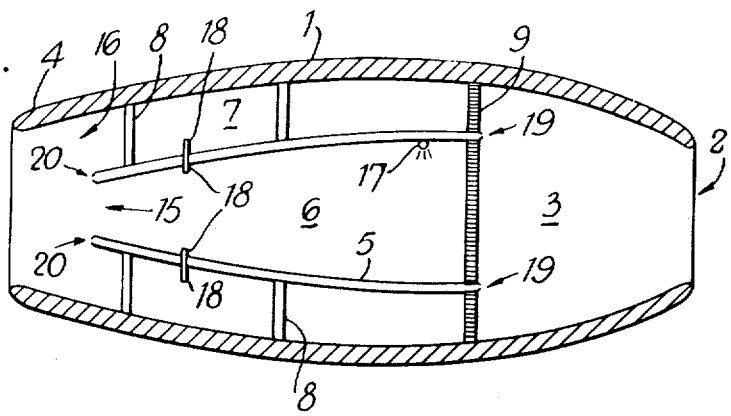

Referring to FIG. 1 there is shown a jet engine comprising a housing 1 formed with air inlet 2 leading to a diffuser 3 and a jet nozzle or outlet 4. Within the housing 1 is a generally cylindrical partition 5 separating the internal space into an inner cylindrical combustion chamber 6 and an outer annular combustion chamber 7. The partition 5 may be supported from the housing by some suitable form of support structure generally indicated by the struts 8. As shown, the partition 5 is hollow and has openings at the upstream and downstream ends to allow cooling air from the diffuser 3 to be bled through so that the partition and structure is not subjected to the full temperature of the interior of the combustion chambers.

Figure 2:
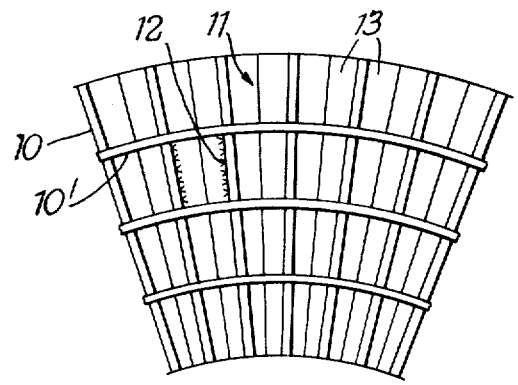
Figure 3:
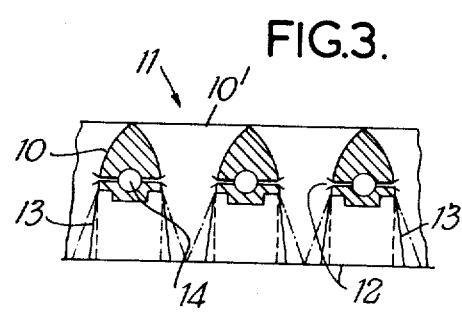

At the upstream end of the combustion chamber 6, 7 is a valve structure 9 which is further illustrated in detail in FIGS. 2 and 3. The structure is in effect a network of walls 10, 10' arranged in a cross-sectional plane and dividing the cross-sectional plane into a number of nearly rectangular valve openings 11. The walls, as shown in FIG. 3, are of generally aerofoil shape on the upstream side so that each rectangular valve opening 11 tapers from the leading edge to a venturi shape. The walls 10 contain fuel ducts 14. Fuel jets 12 are arranged to open laterally from the ducts 14 into the valve openings 11 at the throat of each venturi. On the downstream or combustion chamber side of the network of walls, each opening is closed by a pair of valve flaps 13 formed for example of a resilient metal or other material resistant to the temperatures encountered in the combustion chamber. As shown in FIG. 3 the flaps 13 when unstressed continue the aerofoil surfaces of the struts 8 so that the flaps of each opening 11 converge but do not quite meet. The walls 10' lie in sliding engagement with the side edges of each row of flaps 13 to form the side seal of each valve. When a negative pressure is created in the combustion chamber, the flaps open fully to the position shown in broken lines in FIG. 3 and due to the reduced pressure at the throat fuel is sucked in from the duct passages through the nozzles 12. If desired the fuel may be continually forced as a spray through the nozzles 12. If there is no turbine to allow the use of a pump, then the fuel may be gravity fed or pressure fed by means of air pressure supplied from a high pressure position adjacent the air inlet. When an explosion occurs in the combustion chamber the flaps are forced together to close each opening 11, as shown by chain dotted lines.

It will be appreciated that the non-return valve means of each or any of the embodiments may be as shown in FIGS. 2 and 3 or may be replaced by any other type of non-return means or explosion barrier as already described.

The central combustion chamber 6 tapers towards the jet outlet 4 to form a constricted throat 15 and the outer combustion chamber 7 also converges to a narrow annular throat 16 so that a high velocity exhaust stream resulting from an explosion in one chamber will induce a negative pressure in the other combustion chamber assisting the indraft of fuel air mixture through the non-return valve means and fuel nozzle assembly 9 – 14. As shown, the throats 15, 16 terminate in a common plane.

Both combustion chambers are preferably of substantially the same volume and the throat areas are also substantially the same. The throat area in each case may be for example from 0.5 to 0.7 of the maximum cross-sectional area of each combustion chamber, optimally about 0.6.

Figure 4:
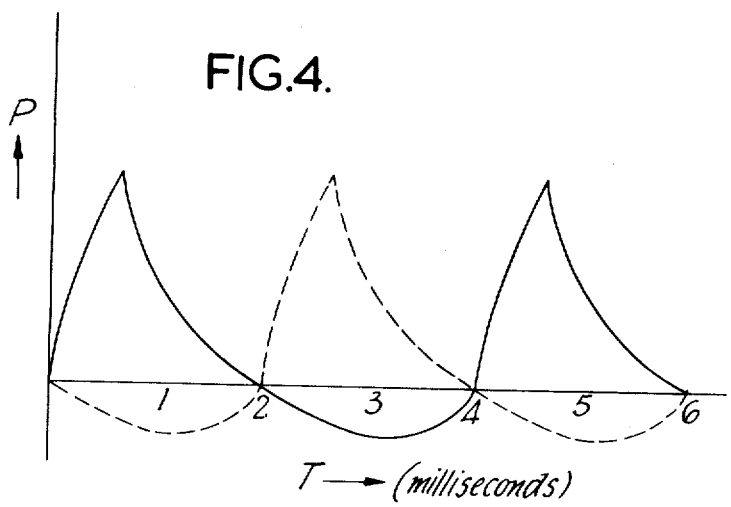

The pulse sequence is illustrated in FIG. 4 which is a pressure time graph. The sequence of explosions in one combustion chamber is shown in continuous lines and that in the other chamber is shown in broken lines. The pressure at the horizontal axis will not necessarily be atmospheric but will be the pressure prevailing immediately on the upstream side of the non-return valve means. It will be appreciated that the explosions are virtually continuous so that bearing in mind the inertia of the gas stream and of the explosions, there will be a continuous throughput of air from the inlet 2 to the outlet 4. The power weight ratio is at least double in view of the alternate explosions which take place, as compared with a conventional pulse jet and furthermore the efficiency is substantially increased by the induced draft in one combustion chamber caused by the explosion in the other chamber which increases the efficiency of filling of the combustion chamber with fuel air mixture. As is well known with a conventional pulse jet, a tail pipe is an essential part. As such tail pipes have been relatively long, such has been responsible for a substantial part of the weight of the pulse jet. In addition, a power loss occurs in the tail pipe which is high due to the high velocity gas flows which result in dissipation of energy in the flow system. The double effect of the tail pipe has an adverse effect on the power/weight ratio. Thus, elimination of the tail pipe reduces the weight while also increasing the power. The result is that the power/weight ratio is nearly doubled.

It is also noted that in the conventional pulse jet, due to the intermittent effect of the jets, there is no way of achieving the use of ram precompression without shrouding. This, of course, adds considerably to the weight of the pulse jet. However, as the air inlet to the unit is continuous, according to the invention, the ram precompression effect is obtained within the jet engine. Thus, at the same flight speed, the air inlet is at higher pressure and therefore denser. The air mass flow is thereby further increased giving rise to increased power for a given size. Finally, it is noted that the ejection effect of gas from one chamber provides a strong suction in the other chamber. This enables a rapid filling of the chamber before ignition. Consequently, more explosions in unit time can occur. This means a greater air mass flow in unit time giving rise to a further increase of power for a given size.

The latter effects of using a continuous air supply and the cooperating suction effect between the two chambers is estimated to increase the power/weight ratio to more than double as compared with pulse jets of known construction.

While an absolute constant volume process does not usually occur in practice, as well illustrated in FIG. 4, the peak pressure is reached after a relatively short time and then expands to a level of the original chamber pressure which existed prior to combusion.

To start the operation of the gas generator, fuel may be sprayed directly into one of the combustion chambers through an auxiliary fuel nozzle 17. The fuel air mixture resulting in the combustion chamber is ignited by a spark or glow igniter 18 causing an induced draft in the opposite combustion chamber which in turn starts the sequence of explosions. The igniters 18 may be in the form of combined spark and glow igniters so that a synchronised spark system can be used to start the explosion sequence if necessary. When the engine is operating efficiency at near the full operating temperature, spark ignition is not necessary. Even the glow igniters may be dispensed with depending upon the internal temperature of the walls of the combustion chambers.

Preferably the partition wall 5 is hollow as shown so that bleed air from the diffuser 3 passes into openings 19 into the space between the outer walls of the partition and is bled out at outlets 20 adjacent the jet outlet 4. This allows very high temperatures to be reached within the combustion chambers. The outer wall of the outer combustion chamber is normally sufficiently cooled by the surrounding air stream but may also be formed hollow so that the external surface of the outer wall may be directly cooled by bleed air. Naturally bleed air cooling may be replaced by other forms of fluid cooling.

Figure 5:
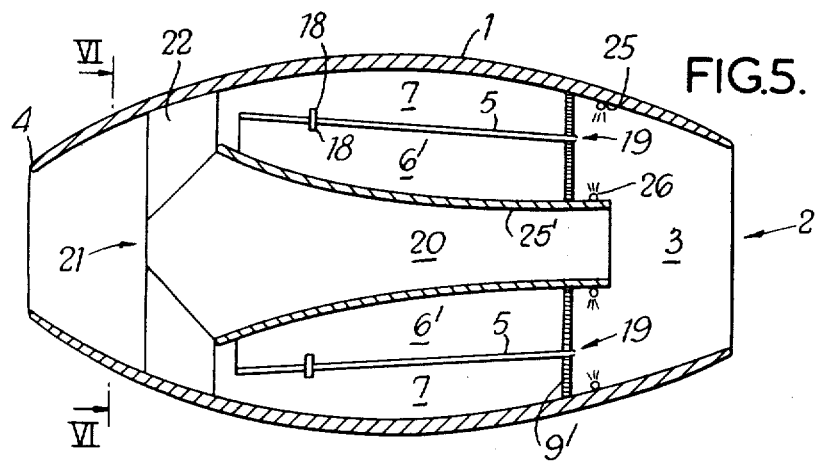

Turning to FIG. 5 there is shown an embodiment of a jet power plant suitable for operating subsonic aircraft. Similar reference numerals are used for corresponding parts already described with reference to FIG. 1. The embodiment differs from that of FIG. 1 in that the axially inner combustion chamber 6' is of annular construction instead of being cylindrical to provide a central through duct 20 for by-pass air from the inlet diffuser 3. The use of by-pass air mixing with the exhaust increases the mass flow of the jet stream. This increases the thrust at low air speeds. In effect the very high temperature exhaust gases of the combustion chamber are utilized to heat and expand the by-pass air stream resulting in greater thermal efficiency under the given operating conditions.

Figure 6:
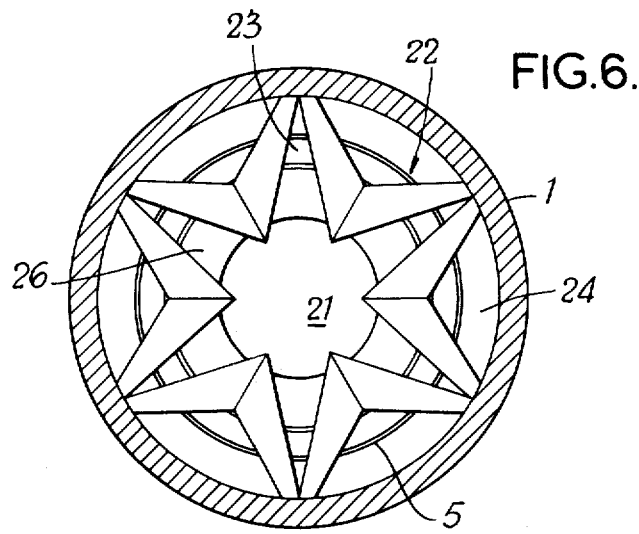

The mixing of the hot exhaust streams and the by-pass air stream before their emergence at the jet nozzle may be assisted by mixing means for example in the form of a fluted partition structure as illustrated more clearly in FIG. 6. This may be formed from a single sheet of metal which is arranged generally frustoconically and then corrugated so that the by-pass air stream is dispersed throughout a passage of star-shaped cross-section, i.e., through the central opening 21 in the partition 22 and through the apices 23 of the star, while the combined exhaust gases from the two combustion chambers pass through the openings 24 formed between the divergent surfaces of the partition as well as within the apex openings 23. This improves the radial mixing of the previously radially separated cold and air streams. The mixed gases then expand and increase in velocity in the jet nozzle.

Instead of injecting the fuel into the valve framework, the fuel has been shown in FIG. 5 as sprayed directly into the diffuser zone immediately upstream of the valve means from fuel lines 25, 25'. To prevent loss of fuel through the by-pass 20, the wall of the by-pass is extended slightly upstream into the diffuser area and the fuel lines are situated in the annular trap zone so created. Naturally this type of fuel injection system may be used alternatively in the embodiment of FIG. 1.

The by-pass duct structure which forms the inner wall of combustion chamber 6' is shown at 26.

Figure 7:
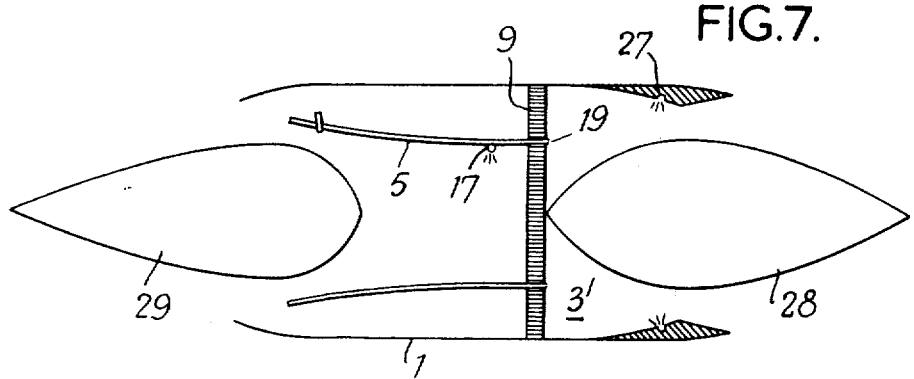

FIG. 7 shows a simple form of power plant suitable for the propulsion of supersonic aircraft. The gas generator is constructed very similarly to that of FIG. 1 and again the same reference numberals have been used for corresponding components. The shape of the various walls and partitions are naturally conformed to configurations suitable for supersonic application. The fuel injection system may be similar to that of FIG. 1 but alternatively the fuel may be sprayed directly into the throat of the inlet through nozzles 27. A supersonic nose and inlet structure is provided including a nose cone 28 which may continue as shown substantially up to the valve means 9 forming an annular diffuser area 3'. Similarly a supersonic type jet nozzle structure is provided including a nozzle hub 29 and the partition 5 extends into the throat of the jet nozzle.

Figure 8:
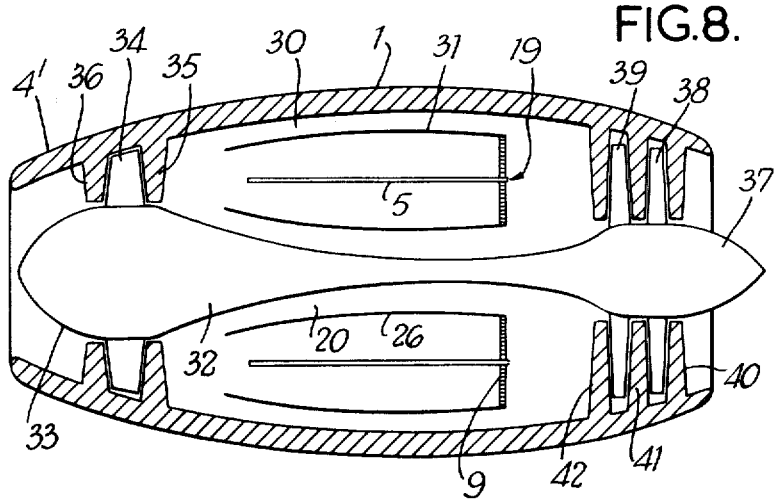

FIG. 8 shows a turbine power plant incorporating the gas generator of the present invention.

Again similar reference numberals have been used for parts corresponding to FIG. 1. The arrangement of the gas generator is similar to that of FIG. 5 with a central air by-pass duct 20. However a second by-pass duct 30 is arranged annularly between the outside wall of the outermost combustion chamber, which is here designated 31 and the surrounding wall of the housing 1. This not only increases the by-pass air, if desired, but insulates the housing 1 from the hot combustion chambers and decreases the heat loss from the combustion chambers. Mounted so as to pass centrally through the duct 20 is a turbine axle 32 which is connnected adjacent the outlet 4' to a turbine stage consisting of hub 33 and blade 34 which are situated between sets of stator blades 35, 36. The turbine stage is displaced downstream of the ends of the combustion chamber sufficiently to allow good mixing of the hot exhaust gases from the combustion chambers and the surrounding streams of by-pass air so that the turbine stage is not unduly heated. If desired additional air-flow mixing means may be incorporated in the mixing zone for example a fluted partition structure of conventional type arranged to mix inner and outer annular streams. As shown a non-return valve means 9 generally similar to that of FIGS. 1 to 3 is employed, but alternatively the outer wall of each combustion chamber may be extended into the inlet as shown in FIG. 5 and fuel nozzles 25 (FIG. 5) may be alternatively located in the trap zone so created.

The axle 32 is connected adjacent the inlet to a compressor consisting of a hub 37 and rows of compressor blades 38, 39 situated between stator vanes 40, 41, 42.

For simplicity the bearing structure for the turbine axles has been omitted but this may be of any conventional type. Similarly although the compressor has been shown as a two-stage axial flow compressor it may consist of any number of desired stages or may be a centrifugal or mixed flow compressor. Similarly the turbine may be constructed of any number of stages or in any suitable manner.

The turbine power plant of FIG. 8 may be used as a jet power plant for an aircraft or as a turbo-prop engine, the hub 37 being connected to a suitable propeller unit. However the power plant is suitable for use as a stationary engine, the outlet being connected to a suitable exhaust and silencing system and the axle connected to the unit to be driven through a suitable transmission. It will be appreciated that the combustion chambers arranged in accordance with the invention greatly improve over the combustion chambers normally used in a gas turbine engine which operate at constant pressure. The combustion chambers of the present invention as arranged for example in FIG. 8 operate at constant volume with appropriately increased thermodynamic efficiency. The unit of FIG. 8 is simple, efficient, well-insulated and may be made of relatively small size suitable for use in for example a road vehicle, helicopter or hovercraft.

It will be apparent that the features of any one particular embodiment may be used where appropriate in any other embodiment shown. For example a single by-pass duct may be used in the embodiment of FIG. 8 or two by-pass ducts may be used in the embodiment of FIG. 5. This may be the equivalent of using a turbine in the embodiment of FIG. 5. Naturally appropriate cooling means must be employed to cool the parts subjected to unduly high temperatures.

Similarly the supersonic power plant of FIG. 7 may if desired be provided with a by-pass system for use at subsonic speeds and/or an after burner system. A supplementary compressor - turbine system as described in U.S. Pat. application Ser. No. 730,021 filed on Sept. 16, 1968 in the name of Alexander Hossen Etessam may be fitted to any of the aircraft power plant described herein.

In order to enable the invention to be more clearly understood, certain structural components of the various power plant such as supporting struts, bearings etc. have been omitted but the construction of these necessary supports will be clearly apparent to those skilled in the art. The various area and volume ratios described in relation to the embodiment of FIG. 1 are generally suitable for the other embodiments.

Various other modifications or improvements may be made within the spirit and scope of the invention as defined in the appended claims.

What I claim is:

1. A gas generator for a turbine or jet power plant comprising
    a housing having an air inlet and an exhaust jet nozzle outlet,
    a pair of substantially coextensive coaxial combustion chambers of substantially equal volume located between said inlet and said outlet,
    non-return valve means at the inlet end of each said combustion chamber separating said combustion chamber from said air inlet,
    means for generating a fuel-air mixture upstream of said valve means,
    means for igniting said fuel-air mixture in said combustion chambers,
    each combustion chamber converging towards said exhaust outlet in the form of mutually inductive nozzles whereby the combustion chambers operate as pulse jets in alternate sequence with the ignition cycle in one chamber creating a reduced pressure in the other chamber thereby assisting the fuel/air intake and at the same time allowing continuous throughput of air from said inlet to said outlet.

2. A gas generator as claimed in claim 1 wherein the combustion chambers are separated by a partition which is formed with a passage for a coolant fluid.

3. A gas generator as claimed in claim 2 wherein the said partition is hollow and the interior communicates with said inlet and outlet to provide cooling by means of an air bleed.

4. A gas generator as set forth in claim 1 wherein one combustion chamber converges to form a constricted throat and the other combustion chamber converges to a narrow annular throat, each said throat terminating in a common plane.

5. A jet ejgine co-prising an inlet with a diffuser, an exhaust jet outlet and a gas generator intermediate the diffuser and outlet, the gas generator comprising only two adjacent coaxially and concentrically arranged combustion chambers, nonreturn valve means at the upstream end of the combustion chambers separating each combustion chamber from the diffuser, means for providing a fuel/air mixture upstream of said valve means and means for igniting said mixture in each combustion chamber, the combustion chambers each converging directly and without individual scavenging means into the jet outlet in the form of mutually inductive nozzles whereby the combustion chambers operate as pulse jets in alternate sequence with the ignition cycle in one chamber creating a reduced pressure in the other chamber thereby assisting the fuel/air intake.

6. A jet engine as claimed in claim 5 including an air by-pass duct leading from a zone adjacent said inlet to a mixing zone downstream of said combustion chambers and upstream of said jet outlet.

7. A jet engine as claimed in claim 6 wherein said by-pass duct passes axially through the engine from said diffuser, said combustion chambers being of annular form and being arranged around the by-pass duct.

8. A jet engine as claimed in claim 7 comprising means downstream of the combustion chambers for mixing the heated exhaust and by-pass air streams prior to their emergence at the nozzle.

9. A jet engine as claimed in claim 7 further comprising a second by-pass duct coaxially surrounding the outermost combustion chamber and leading from a zone adjacent said inlet to a mixing zone downstream of said combustion chambers and upstream of said jet outlet.

10. A jet engine as claimed in claim 9 further comprising a turbine axle mounted to pass centrally through said axial by-pass duct and connected at its downstream end to a turbine at a location spaced from said combustion chamber nozzles sufficiently to allow mixing of the heated exhaust and by-pass air streams and upstream of said jet outlet, and connected to a compressor adjacent the air inlet.

11. A jet engine as claimed in claim 9 wherein the combustion chambers are separated by a hollow partition cooled by bleed air.

12. A jet engine for supersonic aircraft comprising a supersonic nose and inlet structure defining a diffuser, a supersonic jet nozzle structure and a gas generator situated axially between said diffuser and said jet nozzle structure, the gas generator comprising only two combustion chambers namely a cylindrical inner combustion chamber and an annular outer combustion chamber surrounding the inner combustion chamber substantially coextensive therewith and of substantially equal volume thereto, non-return valve means at the inlet end of each said combustion chamber separating said combustion chamber from said air inlet, means for generating a fuel-air mixture upstream of said valve means, means for igniting said fuel-air mixture in said combustion chambers, each combustion chamber converging towards said exhaust outlet in the form of mutually inductive nozzles without individual scavenging means whereby the combustion chambers operate as pulse jets in alternate sequence with the ignition cycle in one chamber creating a reduced pressure in the other chamber thereby assisting the fuel/air intake, and allowing continuous through flow of air from the diffuser.

13. A gas turbine comprising a tubular housing having an air inlet at one end and an exhaust outlet at the other end and a gas generator intermediate said inlet and outlet, said gas generator comprising a housing having an air inlet and an exhaust outlet, only two substantially coextensive combustion chambers of substantially equal volume located between said inlet and said outlet, non-return valve means at the inlet end of each said combustion chamber separating said combustion chamber from said air inlet, means for generating a fuel-air mixture upstream of said valve means, means for signiting said fuel-air mixture in said combustion chambers, each combustion chamber converging directly and without individual scavenging means into said exhaust outlet in the form of mutually inductive nozzles whereby the combustion chambers operate as pulse jets in alternate sequence with the ignition cycle in one chamber creating a reduced pressure in the other chamber thereby assisting the fuel/air intake, an air by-pass duct leading from a zone adjacent said inlet to a mixing zone downstream of said combustion chambers and upstream of said jet outlet and a turbine axle mounted to pass centrally through said axial by-pass duct and connected at its downstream end to a turbine at a location spaced from said combustion chamber nozzles sufficiently to allow mixing of the heated exhaust and by-pass air streams and upstream of said outlet, and connected to a compressor adjacent the air inlet.

14. A gas turbine engine as claimed in claim 13 further comprising a second by-pass duct coaxially surrounding the outermost combustion chamber and leading from a zone adjacent said inlet to a mixing zone downstream of said combustion chambers and upstream of said jet outlet.

15. A gas turbine engine as claimed in claim 13 wherein the combustion chambers are separated by a hollow partition cooled by bleed air.

16. A jet engine comprising a housing having an air inlet at one end to receive an air flow and an air outlet at an opposite end to exhaust the air flow in a continuous manner;

a diffuser in said housing downstream of said inlet for passage of the air flow therethrough;

only two coextensive and coaxial combustion chambers of substantially equal volume within said housing between said diffuser and said outlet without individual scavenging means, an inner chamber of said chambers having a constricted throat at a downstream end thereof in direct communication with said outlet to exhaust a combusted fuel-air mixture thereto and the outer chamber of said chambers converging to a narrow annular throat at a downstream end thereof in direct communication with said outlet to exhaust a combusted fuel-air mixture thereto, said constricted throat and said annular throat being of substantially equal cross-sectional area and being positioned for mutual induction;

non-return valve means between said diffuser and each said combustion chamber for admitting the air flow in alternation to said combustion chambers;

means for generating a fuel-air mixture upstream of said valve means for subsequent flow into said combustion chambers; and means in each combustion chamber for igniting the fuel-air mixture therein.

17. A gas generator for a turbine or jet power plant comprising a housing having an air inlet and an exhaust outlet, only two substantially coextensive coaxial combustion chambers of substantially equal volume extending from said inlet to said outlet, non-return valve means at the inlet end of each said combustion chamber separating said combustion chamber from said air inlet, means for generating a fuel-air mixture upstream of said valve means, means for igniting said fuel-air mixture in said combustion chambers, each combustion chamber converging directly and without individual scavenging means into said exhaust outlet in the form of mutually inductive nozzles whereby the combustion chambers operate as pulse jets in alternate sequence with the ignition cycle in one chamber creating a reduced pressure in the other chamber thereby assisting the fuel/air intake.

* * * * *